United States Patent
Hao

(10) Patent No.: US 11,115,729 B2
(45) Date of Patent: Sep. 7, 2021

(54) METHODS AND APPARATUSES FOR VIDEO PUBLISHING, DEVICE, AND MEMORY MEDIUM

(71) Applicant: Beijing Microlive Vision Technology Co., Ltd., Beijing (CN)

(72) Inventor: Yipeng Hao, Beijing (CN)

(73) Assignee: Beijing Microlive Vision Technology Co., Ltd., Beijing (CN)

( * ) Notice: Subject to any disclaimer, the term of this patent is extended or adjusted under 35 U.S.C. 154(b) by 0 days.

(21) Appl. No.: 16/760,808

(22) PCT Filed: Dec. 28, 2018

(86) PCT No.: PCT/CN2018/124754
§ 371 (c)(1),
(2) Date: Apr. 30, 2020

(87) PCT Pub. No.: WO2020/015332
PCT Pub. Date: Jan. 23, 2020

(65) Prior Publication Data
US 2020/0413162 A1 Dec. 31, 2020

(30) Foreign Application Priority Data
Jul. 19, 2018 (CN) .......................... 201810797810.2

(51) Int. Cl.
*H04N 21/854* (2011.01)
*H04N 21/2743* (2011.01)
(Continued)

(52) U.S. Cl.
CPC ....... *H04N 21/854* (2013.01); *H04N 21/2743* (2013.01); *H04N 21/44008* (2013.01); *H04N 21/47205* (2013.01)

(58) Field of Classification Search
CPC ............. H04N 21/854; H04N 21/2743; H04N 21/44008; H04N 21/47205; H04N 5/76; H04N 21/4334
See application file for complete search history.

(56) References Cited

U.S. PATENT DOCUMENTS 9,973,785 B1 5/2018 Yang et al.
2013/0094830 A1 4/2013 Stone et al.
(Continued)

FOREIGN PATENT DOCUMENTS

CN 105657498 A 6/2016
CN 105828125 A 8/2016
(Continued)

OTHER PUBLICATIONS

International Patent Application No. PCT/CN2018/124754; Int'l Search Report; dated Mar. 6, 2019; 2 pages.

*Primary Examiner* — Anthony Bantamoi
(74) *Attorney, Agent, or Firm* — BakerHostetler

(57) ABSTRACT

Disclosed are methods and apparatuses for video publishing, a device, and a memory medium. The method comprises detecting a video recording request after obtaining a video and video post settings, and recording a video clip based on the video recording request till obtaining a video merge instruction; merging the video and the video clip based on the Video merge instruction to obtain a target video; and uploading, in response to detecting a Video post instruction, the target video and the video post settings to a video server.

14 Claims, 12 Drawing Sheets

(51) Int. Cl.
   *H04N 21/44* (2011.01)
   *H04N 21/472* (2011.01)

(56) References Cited

U.S. PATENT DOCUMENTS

| | | | |
|---|---|---|---|
| 2016/0246452 A1* | 8/2016 | Bockhold | G06F 3/0488 |
| 2017/0294212 A1* | 10/2017 | Allen | H04N 21/2743 |
| 2017/0339446 A1* | 11/2017 | Arms | H04N 21/231 |
| 2018/0102143 A1 | 4/2018 | Allison et al. | |

FOREIGN PATENT DOCUMENTS

| | | |
|---|---|---|
| CN | 106658199 A | 5/2017 |
| CN | 107277411 A | 10/2017 |
| CN | 107872620 A | 4/2018 |
| CN | 108093315 A | 5/2018 |
| CN | 108900791 A | 11/2018 |
| EP | 3219104 A1 | 9/2017 |
| WO | WO 2016/077262 A1 | 5/2016 |

\* cited by examiner

METHODS AND APPARATUSES FOR VIDEO PUBLISHING, DEVICE, AND MEMORY MEDIUM

CROSS-REFERENCE TO RELATED APPLICATIONS

The present application is the national phase application of PCT International Patent Application No. PCT/CN2018/124754, filed on Dec. 28, 2019 which claims priority to Chinese Patent Application No. 201810797810.2, filed on Jul. 19, 2018 with the Chinese Patent Office, all of which are incorporated herein by reference in their entireties.

FIELD

Embodiments of the present disclosure relate to the technical field of video processing, and more particularly relate to methods and apparatuses for video publishing, a device, and a memory medium.

BACKGROUND

To pursue a more colorful life, more and more users are fond of viewing versatile, bizarre and interesting contents and would like to share their bizarre and interesting ideas to others, which boosts a variety of applications enabling such functions.

With such applications, to share a recorded content with others, a user has to record it first and then upload it to the server for other users to view.

However, the prior art provides no means to modify a video already in a post interface; as such, the user has to re-record a video and re-edit video post settings, which is rather fussy and causes poor user experience.

SUMMARY

Embodiments of the present disclosure provide methods and apparatuses for video publishing, a device, and a memory medium, so as to realize continued recording of a to-be-published video without a need of re-editing the video post settings, thereby offering better user experience.

An embodiment of the present disclosure provides a method for video publishing, comprising: detecting a video recording request after obtaining a video and video post settings, and recording a video clip based on the video recording request till obtaining a video merge instruction; merging the video and the video clip based on the video merge instruction to obtain a target video; and uploading, in response to detecting a video post instruction, the target video and the video post settings to a video server.

An embodiment of the present disclosure further provides a method for video publishing, comprising: obtaining, in response to detecting a select operation on a Draft control in a video post interface, a video and video post settings; starting, in response to detecting a tap operation on a Video Record control in a Video Shoot interface, recording of a video clip till detecting a select operation on a video merge control, and merging the video and the video clip to obtain a target video; and uploading, in response to detecting a select operation on a Post control in a video post interface, the target video and the video post settings to a video server.

An embodiment of the present disclosure further provides an apparatus for video publishing, comprising: a detecting module used for detecting a video recording request after obtaining a video and video post settings, and recording a video clip based on the video recording request till obtaining a video merge instruction; a merging module used for merging the video and the video clip based on the video merge instruction to obtain a target video; and an uploading module used for uploading, in response to detecting a video post instruction, the target video and the video post settings to a video server.

An embodiment of the present disclosure further provides an apparatus for video publishing, comprising: an obtaining module used for obtaining, in response to detecting a select operation on a Draft control in a video post interface, a video and video post settings; a recording module used for starting, in response to detecting a tap operation on a Video Record control in a Video Shoot interface, recording of a video clip till detecting a select operation on a video merge control, and merging the video and the video clip to obtain a target video; and an uploading module used for uploading, in response to detecting a select operation on a Post control in a video post interface, the target video and the video post settings to a video server.

An embodiment of the present disclosure further provides a terminal device, comprising: one or more processors; a memory used for storing one or more programs; wherein when the one or more programs are executed by the one or more processors, the one or more processors are caused to implement any of the above methods for video publishing according to the embodiments of the present disclosure.

An embodiment of the present disclosure further provides a computer-readable memory medium on which a computer program is stored, wherein the program, when being executed by the processor, implements any of the above methods for video publishing according to the embodiments of the present disclosure.

With the process of detecting a video recording request after obtaining a video and video post settings, recording a video clip based on the video recording request till obtaining a video merge instruction, merging the video and the video clip based on the video merge instruction to obtain a target video, and uploading, in response to detecting a video post instruction, the target video and the video post settings to a video server, the technical solutions provided by the present disclosure realize continued recording of a to-be-published video, such that the finally published video may cover different scenes at different time with a large time span and a large geographical span, thereby imparting rich and versatile contents to the target video.

DETAILED DESCRIPTION OF EMBODIMENTS

Figure 1:
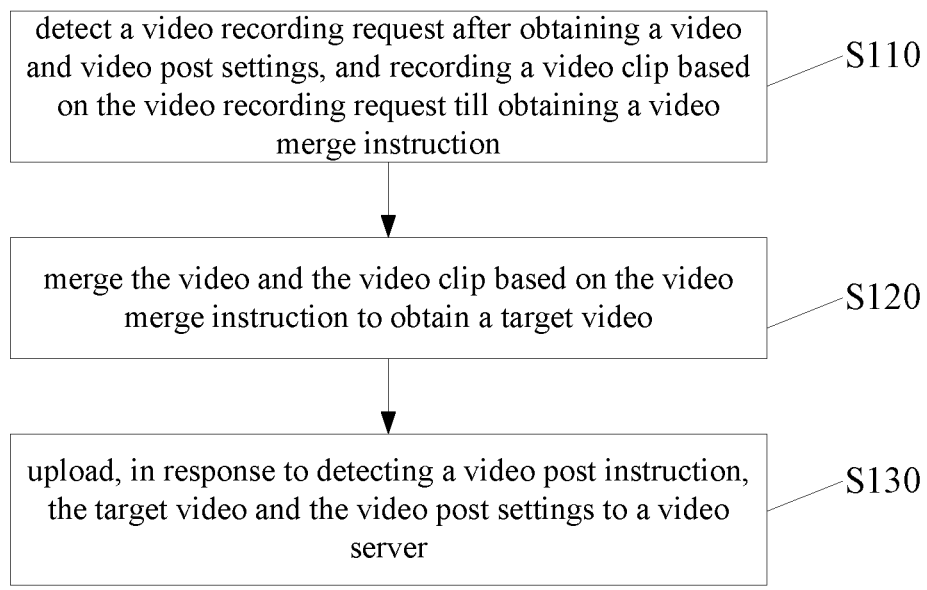
FIG. 1 is a flow diagram of a method for video publishing in an embodiment of the present disclosure.

Hereinafter, the present disclosure will be illustrated through preferred embodiments in conjunction with the accompanying drawings. The preferred embodiments described herein are only for illustrating the present disclosure, not for limiting the present disclosure. Additionally, for the ease of depiction, only those parts related to the present disclosure, rather than the whole structure, are illustrated in the drawings.

It should be noted that like reference numerals and letters express similar terms in the accompanying drawings; therefore, once a certain element is defined in a figure, it needs no further definition and explanation in subsequent drawings. Meanwhile, the terms "first" and "second" are only used for discriminative purposes, which shall not be understood as indicating or implying a relative importance.

Embodiments

FIG. 1 is a flow diagram of a method for video publishing provided according to an embodiment of the present disclosure. This embodiment is applicable to a scenario of video publishing. The method may be executed by an apparatus for video publishing in the embodiments of the present disclosure. The apparatus may be implemented by software and/or hardware and may be used in a terminal device, e.g., a mobile phone and/or a tablet computer, etc. As shown in FIG. 1, the method comprises steps of:

S110: detecting a video recording request after obtaining a video and video post settings, and recording a video clip based on the video recording request till obtaining a video merge instruction.

In an embodiment, the video post settings include location information, share To information, add challenge information, and user inputted textual information, wherein the user inputted textual information may refer to a user-inputted video-associated text. For example, the video post settings may include: video description inputted by the user in the video post interface: "好美so beautiful)"; @friends set to: @柠檬("Lemon"); location set as: Tianjin; add challenge set to: " 是时候炫球技了(time to showcase your ball skills"); and share to: public, etc.

In an embodiment, the video refers to an already recorded video in the video post interface, e.g., video A recorded in the video shoot interface, which has not been not processed yet; by directly tapping "Next," the interface jumps to the video post interface; then, the video refers to video A displayed in the video post interface.

In an embodiment, the video recording request may refer to a video recording request generated in response to the user's tap operation on the continue shooting control on the video edit interface.

In an embodiment, the video is located in the video post interface; after inputting the video post settings, the user obtains the video and the video post settings in the video post interface; after the video and the video post settings are obtained, in response to detecting the video recording request inputted by the user's tapping the record button, a video clip is recorded based on the video recording request till obtaining a video merge instruction.

In an embodiment, the user records a video, edits the video, and inputs video post settings in the video post interface; in this case, if the user needs to modify the recorded video, he or she needs to store the video post settings and the video in the current video post interface; then, in response to detecting the video recording request, a video clip is recorded based on the video recording request till obtaining a video merge instruction.

S120: merging the video and the video clip based on the video merge instruction to obtain a target video.

In an embodiment, the manner of merging the video and the video clip based on the video merge instruction refers to merging the video and the video clip sequentially according to a time order of generating the video clip, thereby obtaining a target video. For example, the video and the video clip may be merged based on the video merge instruction in the following manner: obtaining video Q in the video post interface, recording video clip A, video clip B, and video clip C based on the video recording request, merging the video Q with the video clip A, the video clip B, and the video clip C based on the video merge instruction; in this way, the target video refers to the video resulting from merging the video Q sequentially with the video clip A, the video clip B, and the video clip C.

S130: uploading, in response to detecting a video post instruction, the target video and the video post settings to a video server.

In an embodiment, the video post instruction may be a video post instruction generated by the user's tapping the post control.

In an embodiment, in response to detecting a video post instruction generated by the user's tapping the post control, the target video resulting from merging the video and the video clip, and the video post settings obtained in the video post interface, are uploaded to the video server.

In an embodiment, the video A has been recorded; the user inputs the video post settings in the video post interface. The video A in the video post interface and the video post settings inputted by the user are obtained; the user taps the Record control to generate a video recording request; in response to detecting the video recording request, a video clip is recorded based on the video recording request, till the user taps the video merge control to generate a video merge instruction.

In an embodiment, before the detecting a video recording request, the method further comprises: obtaining a video save request; and storing the video and the video post settings based on the video save request.

In an embodiment, the video save request may be generated by the user's tapping the draft control in the video post interface or generated by the user's tapping the save to local control in the video post interface. This embodiment has no limitation thereto.

In an embodiment, the video and the video post settings in the video post interface are saved in response to obtaining the video save request.

In an embodiment, the user records video A, and edits the video A to obtain edited video B; by tapping the next control in the video edit interface, the interface jumps to the video post interface; in the video post interface, after the user inputs video post settings R, if the user abruptly wants to continue recording a segment of video following the previously edited video B, he/she taps the draft control in the video post interface; then the interface jumps from the video post interface to the my profile page. The user taps the videos folder on the my profile page to jump to the draft box. The user taps the video in the draft box to get access to the video post interface. In the video post interface, the user taps the return to edit control to jump to the video edit interface; in the video edit interface, the user taps the continue shooting control to jump to the video shoot interface. In the video shoot interface, the user taps the video record control to start video recording. The user releases the video record control and the recording ends, thereby obtaining video clip Q. The user taps again on the video record control to start video recording. The user releases the video record control and the recording ends, thereby obtaining video clip P. The user further taps the video record control to start video recording. The user releases the video record control and the recording ends, thereby obtaining video clip W. In response to the user's tapping the end video recording control, the video B is merged with the video clip Q, the video clip P, and the video clip W to obtain the target video. The user taps the Post control to upload the target video (which is the video resulting from sequentially merging the video B with the video clip Q, video clip P, and video clip W in a time order) and the video post settings R to the video server.

With the process of detecting a video recording request after obtaining a video and video post settings, recording a video clip based on the video recording request till obtaining a video merge instruction, merging the video and the video clip based on the video merge instruction to obtain a target video, and uploading, in response to detecting a video post instruction, the target video and the video post settings to a video server, the technical solution provided by this embodiment realizes continued recording of a to-be-published video, such that the finally published video may cover different scenes at different time with a large time span and a large geographical span, thereby imparting rich and versatile contents to the target video.

Figure 2:
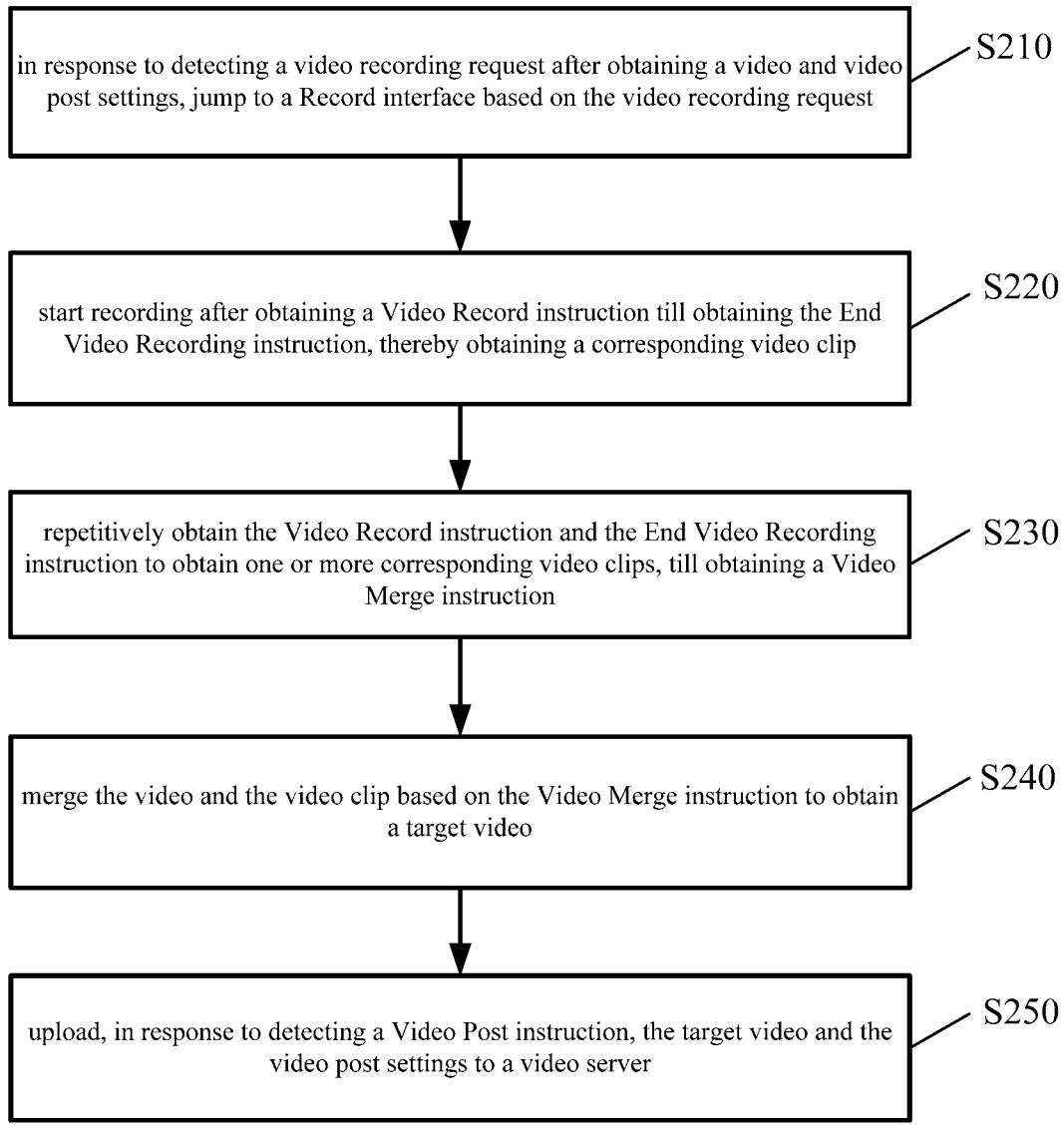
FIG. 2 is a flow diagram of another method for video publishing in an embodiment of the present disclosure.

FIG. 2 shows a flow diagram of another method for video publishing according to an embodiment of the present disclosure. This embodiment is illustrated based on the above embodiment. In this embodiment, recording a video clip based on the video recording request till obtaining a video merge instruction comprises: jumping to the record interface based on the video recording request; upon obtaining the video record instruction, starting recording till obtaining the end video recording instruction, thereby obtaining the corresponding video clip; in response to repetitively obtaining the video record instruction and the end video recording instruction, obtaining one or more corresponding video clip till obtaining the video merge instruction.

As shown in FIG. 2, a method according to this embodiment comprises steps of:

S210: in response to detecting a video recording request after obtaining a video and video post settings, jumping to a record interface based on the video recording request.

S220: starting recording after obtaining a video record instruction till obtaining the end video recording instruction, thereby obtaining a corresponding video clip.

In an embodiment, the end video recording instruction may be implemented by the user's releasing the video record control or implemented by the user's tapping the end video recording control. This embodiment has no limitation thereto.

In an embodiment, the corresponding video clip refers to a video clip recorded during the period from starting recording upon obtaining the video record instruction to ending recording upon obtaining the end video recording instruction. For example, the user taps the video record control to start video recording, and after the user releases the video record control, the recording ends; then, the corresponding video clip refers to the video clip recorded during the period from starting recording the video to ending recording the video.

In an embodiment, the video recording starts upon obtaining the video record instruction, and the video recording ends upon obtaining the end video recording instruction, thereby obtaining the corresponding video clip.

In an embodiment, the end video recording instruction may be triggered by the user, or triggered by determining whether the sum of the length of the video and the length of the video clip reaches a video length threshold.

In an embodiment, the end video recording instruction may be triggered by the user's operation on releasing the video record control. Or, because the length threshold of the recordable video is fixed, if the sum of the length of the previously stored video and the length of the recorded video clip reaches the video length threshold, then the end video recording instruction is triggered.

In an embodiment, in the video post interface; after the user inputs the video post settings, the video and the video post settings in the video post interface are obtained; after the video and the video post settings are obtained, in response to detecting the video recording request inputted by the user's tapping the continue shooting control, a video clip is recorded till the sum of the length of the video and the length of the video clip is equal to the video length threshold; then the video and the video clip are merged to obtain the target video.

In an embodiment, the user records a video, edits the video, and inputs video post settings in the video post interface; at this point, if the user wants to modify the recorded video, the video post settings and the video in the current video post interface need to be stored; then, in the case of detecting a video recording request, a video clip is recorded based on the video recording request, till the sum of the length of the video and the length of the video clip is equal to the video length threshold; then, the video and the video clip are merged to obtain a target video.

S230: repetitively obtaining the video record instruction and the end video recording instruction to obtain one or more corresponding video clips, till obtaining a video merge instruction.

In an embodiment, the above step of obtaining the video record instruction and the end video recording instruction are repeated, wherein recording starts upon obtaining the video record instruction; and recording ends when obtaining the end video recording instruction, thereby obtaining the video clip recorded during the period from obtaining the corresponding video recording instruction to obtaining the end video recording instruction; the video record instruction and the end video recording instruction are repetitively obtained till obtaining a video merge instruction.

In an embodiment, the user taps the video record control to start recording a video; the user releases the video record control to stop recording. A video clip is recorded during the period from the user's tapping the video record control to the user's releasing the video record control. The user taps again the video record control to start recording, and releases the video record control to stop recording. As such, one or more video clips are further recorded during the period from the user's tapping the video record control to the user's releasing the video record control till the user taps the video merge control to perform page jumping.

S240: merging the video and the video clip based on the video merge instruction to obtain a target video.

In an embodiment, the video obtained in the video post interface and the recorded video clip are merged according to the video merge instruction to obtain the target video.

In an embodiment, video A refers to the video obtained in the video post interface; corresponding video clip B is obtained during the period from starting recording upon obtaining the video record instruction to obtaining the end video recording instruction; corresponding video clip C is obtained during the period from starting recording upon obtaining the video record instruction again till obtaining the end video recording instruction; after obtaining the video clip C, in response to obtaining a video merge instruction, the video A, the video clip B, and the video clip C are merged based on the video merge instruction, thereby obtaining the target video.

S250: uploading, in response to detecting a video post instruction, the target video and the video post settings to a video server.

In an embodiment, the user taps the post control in the video post interface to generate a video post instruction; in response to detecting the video post instruction; the terminal device uploads the previously merged target video and the video post settings obtained in the video post interface to the video server.

In an embodiment, the method further comprises: in the record interface, obtaining a video clip delete instruction; and deleting the latest video clip based on the video clip delete instruction.

In an embodiment, the video clip delete instruction is generated by the user's tapping the delete control in the video shoot interface.

In an embodiment, the video clip whose recording time is closest to the current time in the stored video is deleted based on the video clip delete instruction.

In an embodiment, the user records video A, wherein the video A includes video clip A1, video clip A2, and video clip A3 according to the order of their recording time; the video A is unedited. The user taps the next control in the video edit interface to jump to the video post interface. In the video post interface, after inputting the video post settings R, if the user abruptly wants to continue recording a segment of video following the previously recorded video A, the user taps the draft control in the video post interface, and the interface jumps from the video post interface to the my profile page. When the user taps videos folder in the my profile page to jump to the draft Box. The user taps the video in the draft Box to get access the video post interface. In the video post interface, the user taps the return-to-edit control to jump to the video edit interface. In the video edit interface, the user taps the continue shooting control to jump to the video shoot interface. If the user wants to delete part of the previously recorded video A, the user taps the delete control in the video shoot interface to delete the video clip A3 in the video A; at this point, the video A includes video clip A1 and video clip A2. Video clip Q is obtained during the period from start of video recording in response to the user's tapping the video record control in the video shoot interface to end of the video recording in response to the user's releasing the video record control; video clip P is obtained during the period from start of video recording in response to the user's tapping the video record control again to end of the recording in response to the user's releasing the video record control; video clip W is obtained during the period from start of video recording in response to the user's further tapping the video record control to end of the video recording in response to the user's releasing the video record control. If the user is not happy with the video clip W, the user may tap the delete control in the video shoot interface to delete the video clip W. After the video clip W is deleted, the user taps the end video recording control to merge the video B, the video clip Q and the video clip P to obtain a target video. The user taps the post control to upload the target video (which is a video resulting from sequentially merging the video B with the video clip Q and the video clip P in a time order) and the video post settings R to the video server.

In another embodiment, in the video shoot interface, when the user taps the video record control, video recording starts; when the user releases the video record control, video recording ends, thereby obtaining the video clip Q. When the user taps again the video record control, video recording starts; when the user releases the video record control, video recording ends, thereby obtaining the video clip P. When the user further taps the video record control, video recording starts; when the user releases the video record control, video recording ends, thereby obtaining the video clip W. If the sum of the lengths of the video clip Q, the video clip P and the video clip W is equal to a preset video length threshold, the video B is merged with the video clip Q, the video clip P, and the video clip W to obtain a target video. The user taps the Post instruction to upload the target video (which is the video resulting from sequentially merging the video B with the video clip Q, the video clip P, and the video clip W according to a time order) and the video post settings R to the video server.

With the process of jumping, in response to detecting a video recording request after obtaining the video and the video post settings, to the recording interface based on the video recording request; obtaining a corresponding video clip during the period from starting recording upon obtaining the video record instruction till obtaining the end video recording instruction, obtaining one or more subsequent video clips by repetitively obtaining the video record instruction and the end video recording instruction till obtaining the video merge instruction, merging the video and the video clips based on the end video recording instruction to obtain a target video, and uploading, in response to detecting a video post instruction, the target video and the video post settings to the video server, the technical solution of this embodiment realizes continued recording of a to-be-published video, such that the finally published video may cover different scenes at different time with a large time span and a large geographical span, thereby imparting rich and versatile contents to the target video.

Figure 3A:
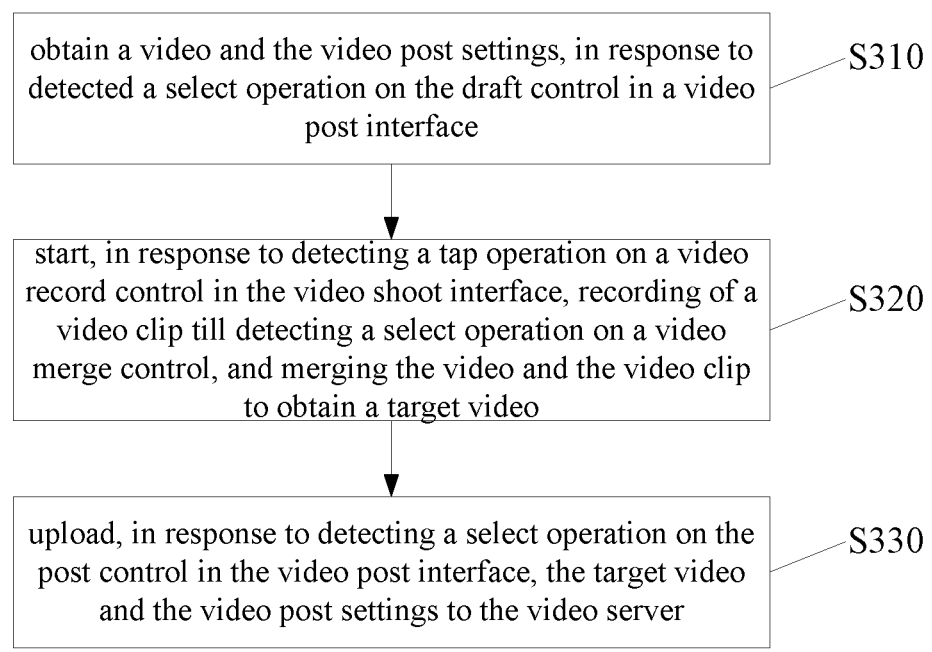
FIG. 3A is a flow diagram of a further method for video publishing in an embodiment of the present disclosure.

FIG. 3A is a flow diagram of a further kind of method for video publishing provided according to an embodiment of the present disclosure. This embodiment is applicable to a scenario of video publishing. The method may be executed by an apparatus for video publishing in this embodiment. The apparatus may be implemented by software and/or hardware. As shown in FIG. 3A, the method comprises steps of:

S310: Obtaining a video and the video post settings, in response to detected a select operation on the draft control in a video post interface.

In an embodiment, when the video is in the video post interface, the video and the video post settings are obtained in response to detecting of the user's select operation on the draft control in the video post interface.

Figure 3B:
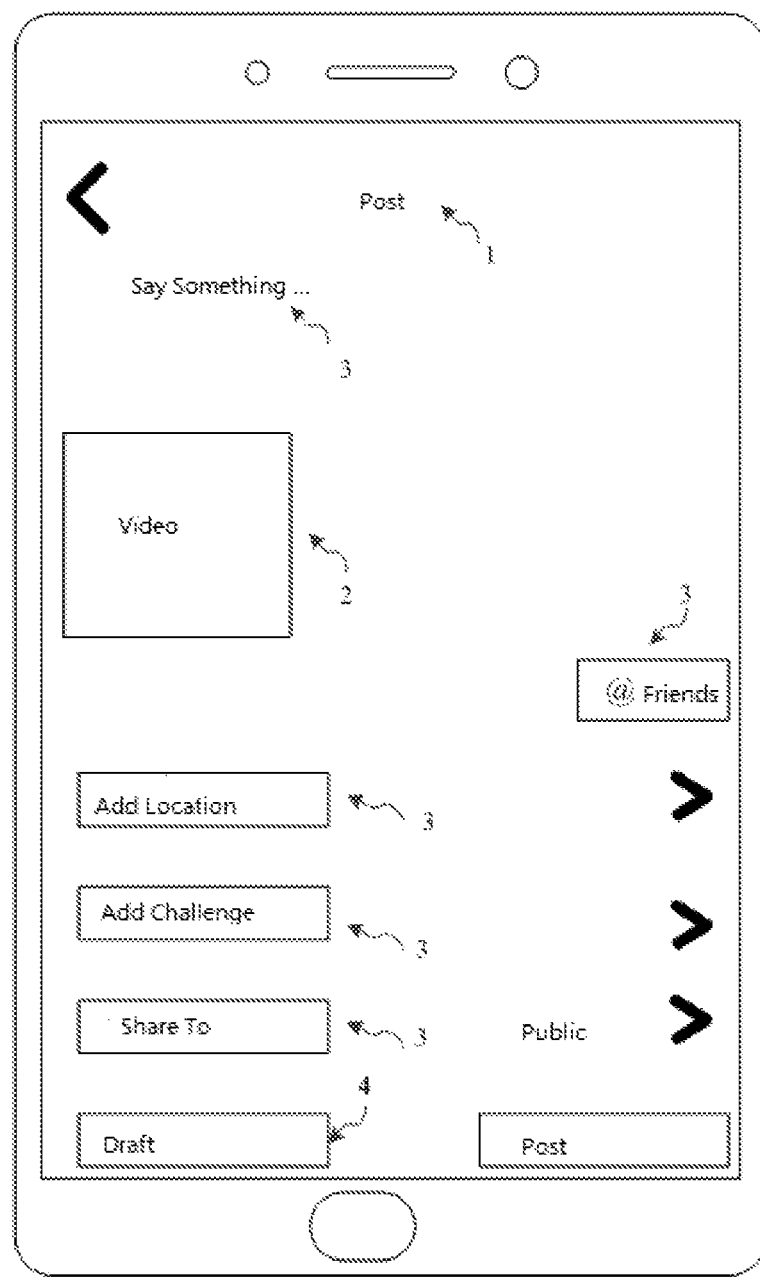
FIG. 3B is a structural schematic diagram of a video post interface in an embodiment of the present disclosure.
Figure 3C:
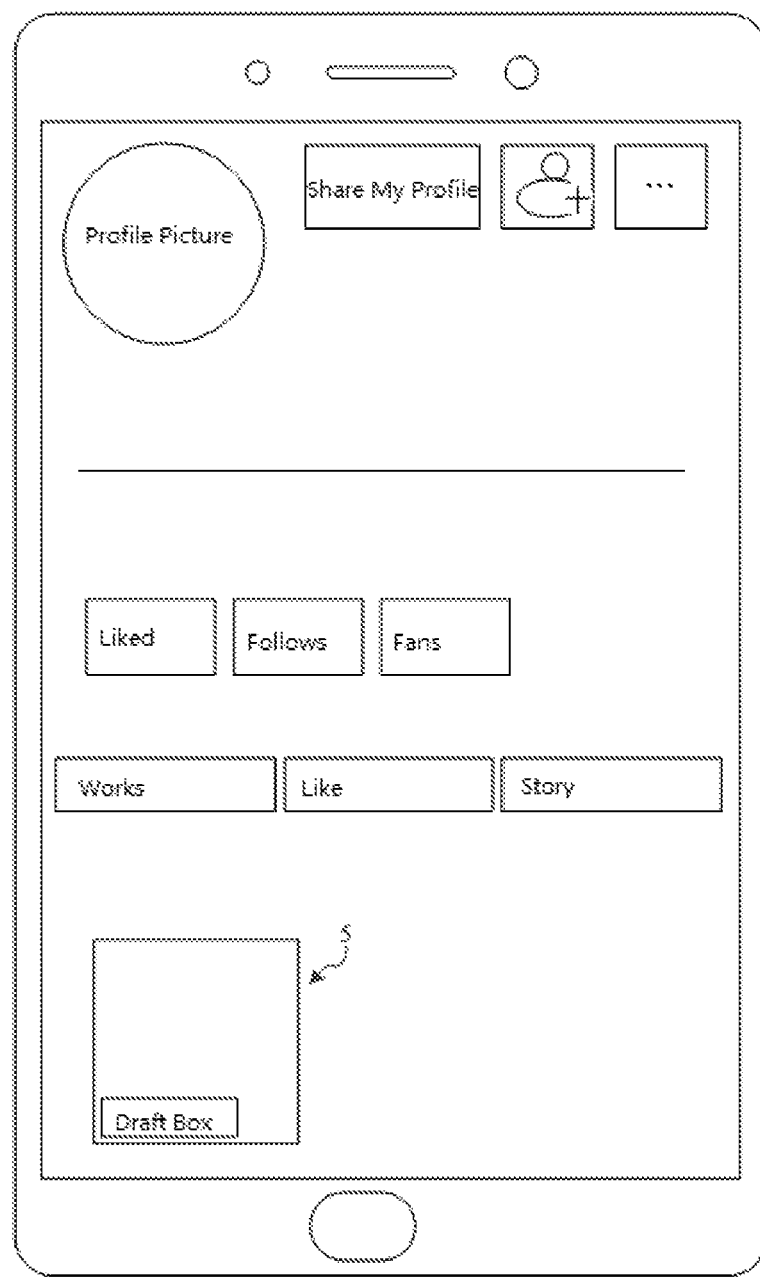
FIG. 3C is a structural schematic diagram of a My Profile page in an embodiment of the present disclosure.
Figure 3D:
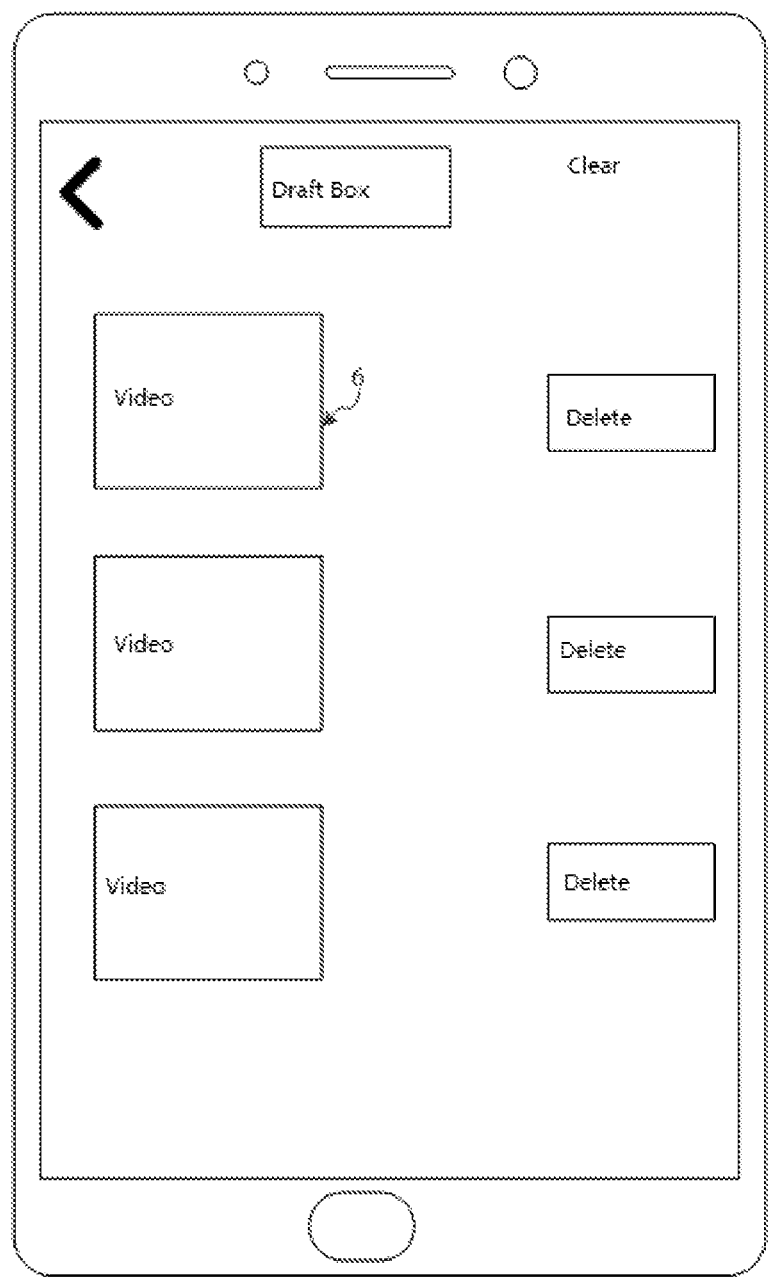
FIG. 3D is a structural schematic diagram of a Draft Box in an embodiment of the present disclosure.

Hereinafter, illustration will be made with a certain video share application on a smartphone as an example. FIG. 3B shows a structural schematic diagram of a video post interface, wherein the video post interface may comprise: Post control 1, video 2, video post settings 3, and draft control 4. In this embodiment, the video post settings are not limited to the contents shown in FIG. 3B, which may further include other information. A user taps the draft control in the video post interface to generate a select operation on the draft control in the video post interface corresponding to the draft control, and stores the video and the video post settings in the video post interface; then, the interface jumps to the my profile page. As shown in FIG. 3C, by tapping the videos folder 5 in the my profile page, the user gets access to the draft box shown in FIG. 3D. In this embodiment, the number of videos in the draft box refers to the number of videos stored by the user in the draft box; FIG. 3D shows a scenario in which the draft box has 3 videos; however, the number of videos in the draft box may be 1 or 2 or other number, which is not limited in this embodiment. The user taps the video 6 in the draft box (any video in the draft box may be tapped, depending on which video the user needs to edit) to get access to the video post interface shown in FIG. 3E (compared with the video post interface shown in FIG. 3B, the video post interface shown in FIG. 3E additionally provides a cancel control 8, and tags the return control as "return to edit"). The user taps the return to edit control 7 shown in FIG. 3E to get access to the video edit page shown in FIG. 3F; then, the user taps the continue shooting control 9 in FIG. 3F to jump to the video shoot interface shown in FIG. 3G.

S320: starting, in response to detecting a tap operation on the video record control in the Video Shoot interface, recording a video clip till detecting a select operation on the video merge control, and merging the video and the video clip to obtain the target video.

Figure 3E:
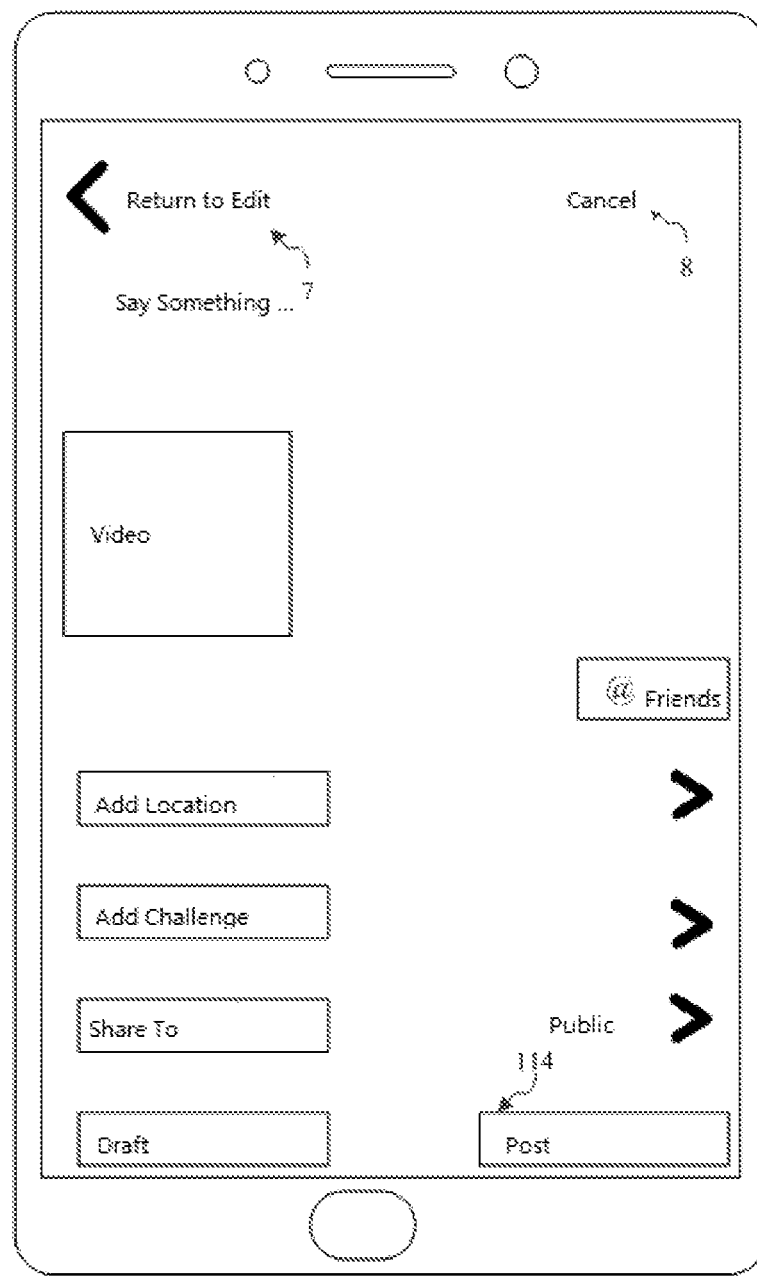
FIG. 3E is a structural schematic diagram of another video post interface in an embodiment of the present disclosure.
Figure 3F:
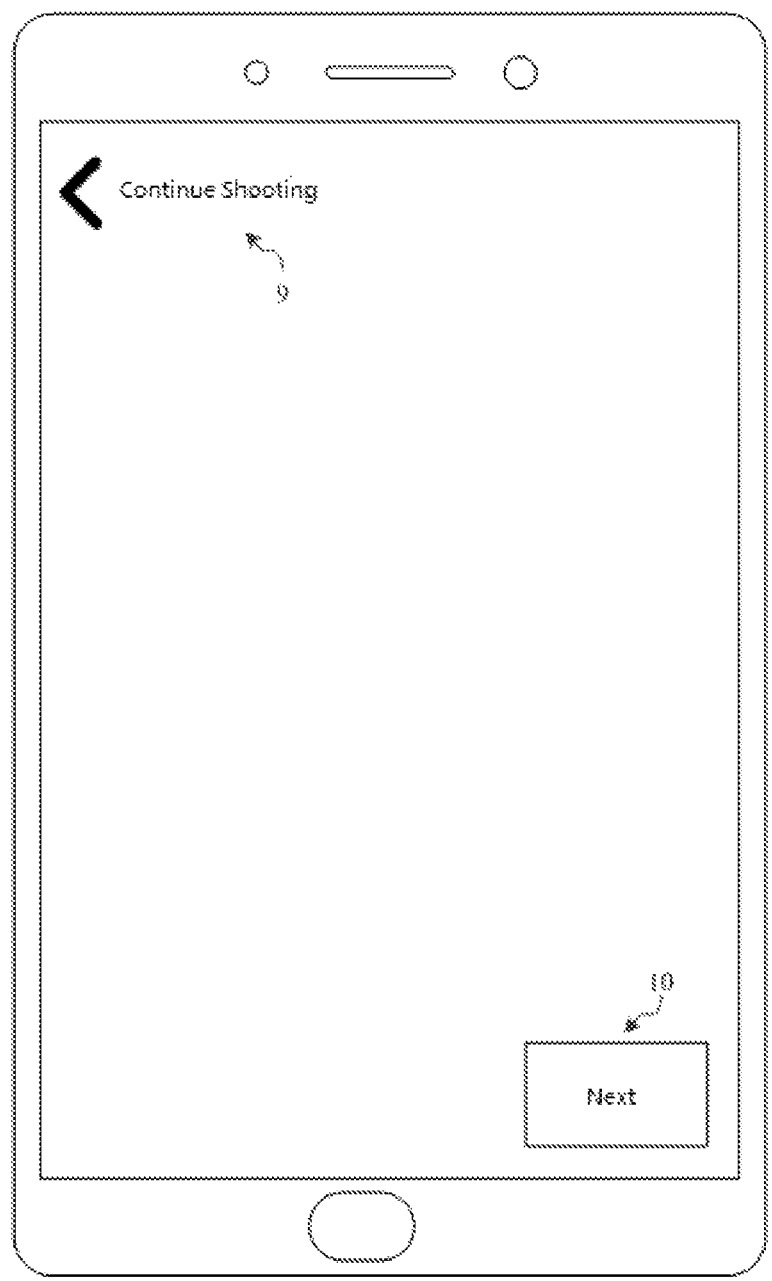
FIG. 3F is a structural schematic diagram of a video edit interface in an embodiment of the present disclosure.
Figure 3G:
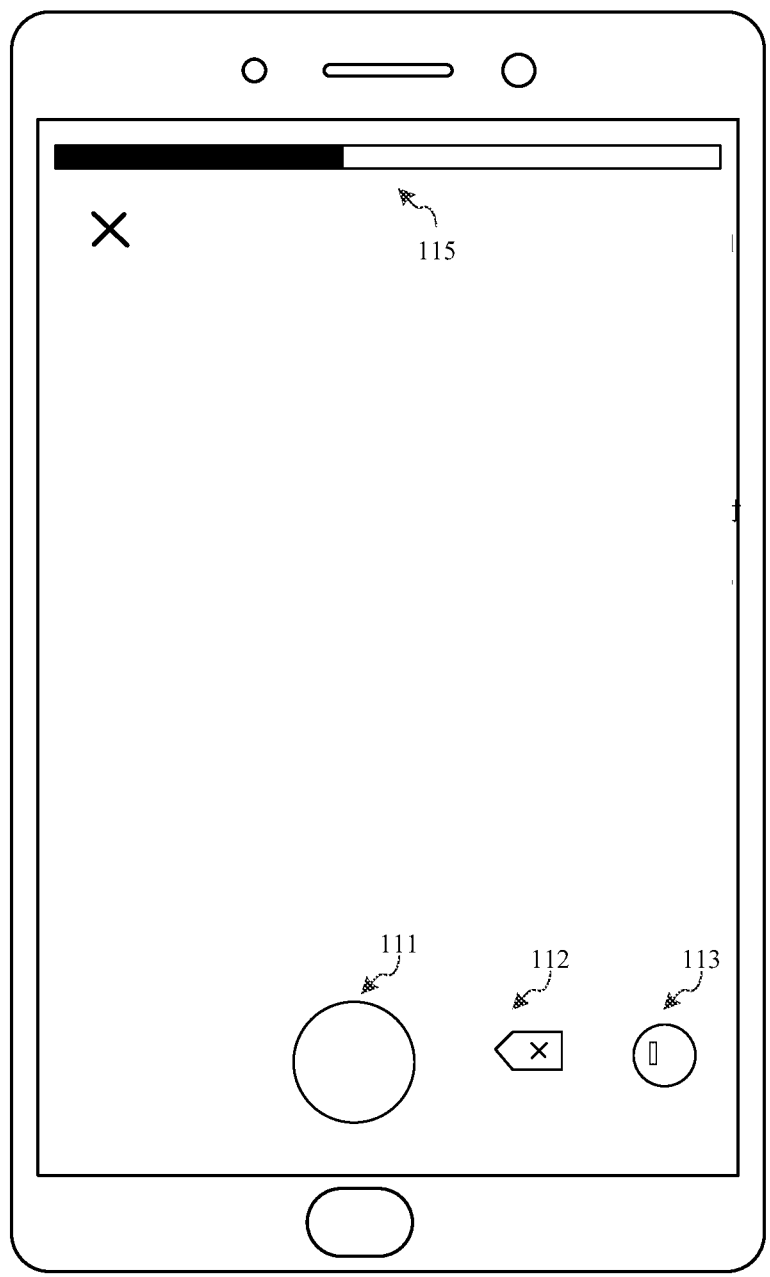
FIG. 3G is a structural schematic diagram of a video shoot interface in an embodiment of the present disclosure.

In an embodiment, in response to detecting a tap operation on the video record control 111 in the video shoot interface shown in FIG. 3G a video clip starts recording till detecting the user's select operation on the video merge control 113 shown in FIG. 3G; then the video and the video clip are merged to obtain a target video. After obtaining the target video, the target video may be subjected to a video edit operation such as selecting a music, tuning the volume, and cutting a music, etc., which is not limited herein.

In an embodiment, the starting, in response to detecting a tap operation on the video record control in the video shoot interface, recording a video clip till detecting a select operation on the video merge control, and merging the video and the video clip to obtain the target video, comprises: detecting the tap operation on the video record control in the video shoot interface, starting recording a video clip till detecting a release operation on the video record control to obtain a corresponding video clip; continuing to detect the tap operation on the video record control in the video shoot interface to obtain a further video clip till detecting a select operation on the video merge control, and merging the video and the video clips to obtain the target video.

In an embodiment, in response to detecting a tap operation on the video record control 111 in the video shoot interface shown in FIG. 3Q recording of a video clip starts till detecting the user's release operation on the video record control 111 to obtain a recorded video clip; by continuously detecting the user's tap operation on the video record control 111 in the video record interface, in response to detecting the user's tap operation on the video record control 111 in the video record interface, recording of a video clip starts till detecting the user's release operation on the video record control 111, thereby obtaining another recorded video clip; the above steps are repeated till obtaining the user's select operation on the video merge control 113, then the video and the video clips are merged to obtain the target video.

In an embodiment, the method further comprises: deleting, in response to detecting a tap operation on a delete control in the video shoot interface, the latest video clip in the video clips.

In an embodiment, the deleting, in response to detecting a tap operation on a delete control in the video shoot interface, the latest video clip in the video clips for example may comprise: obtaining video A in the video post interface, and recorded video clip X, video clip Y, and video clip Z, wherein the video and the recorded video clips are sorted according to a time sequence as first video A, then video clip X, video clip Y, and video clip Z; in response to detecting the user's tap operation on the delete control in the video shoot interface, deleting the latest video clip Z in the recorded video clips; if a tap operation on the delete control in the video shoot interface is detected after deleting the video clip Z, then deleting the latest video clip Y in the recorded video clips.

In an embodiment, as shown in FIG. 3Q by tapping the delete control 112, the latest video clip in the video clips is deleted. In an embodiment, detecting of the user's tap operation on the delete control in the video shoot interface may occur before continued recording or after continued recording. That detecting of the user's tap operation on the delete control in the video shoot interface occurs before continued recording means that before continuing shooting in the video shoot interface, the user performs a delete operation on the video obtained in the video post interface. For example, the video obtained in the video post interface includes video clip P and video clip Q; then before continued shooting in the video shoot interface, the user may perform a delete operation on the video clip P and the video clip Q; if the recording time of the video clip Q is closer to the current time than the video clip P, the video clip Q is deleted based on the user's tap operation on the delete control in the video shoot interface.

S330: uploading, in response to detecting a select operation on the post control in the video post interface, the target video and the video post settings to the video server.

In an embodiment, before detecting a select operation on the post control in the video post interface, the user may edit the target video or do nothing to the target video.

In an embodiment, the user taps the next control 10 shown in FIG. 3F to jump to the video post interface shown in FIG. 3E; in response to detecting the user's select operation on the post control 114 in the video post interface, the target video and the previously stored video post settings are uploaded to the video server.

In an embodiment, in response to detecting a tap operation on the video record control in the video shoot interface, recording a video segment is started till detecting that the progress bar reaches completion; then the recording ends; in response to detecting a select operation on the video merge control, the video and the video clips are merged to obtain the target video.

In an embodiment, as shown in FIG. 3Q a video shooting progress bar 115 is disposed above the video shoot interface; by observing the video shooting progress bar, a gap between the length of the being shot video and the allowable total length of the video to be shot may be known; progressing of the video shooting progress bar is associated with the shooting mode. If the shooting mode is fast-speed shooting, the progress bar progresses relatively quickly; if the shooting mode is slow-speed shooting, the progress bar progresses relatively slowly. As shown in FIG. 3G the black portion (which may also be a yellow portion; this embodiment has no limitation thereto) in the progress bar 115 reveals the length of the shot video, while the white portion indicates the remained allowable length for recording; the user may record till the progress bar reaches completion, i.e., the progress bar becomes completely black. Once the progress bar reaches completion, continued recording is disabled (even the video recording control). In other words, after the progress bar reaches completion, the video recording ends; if the user deletes part of the recorded video clip by tapping the delete control 112, the progress bar displays the remained video length after the part of recorded video clip is deleted; then continued recording is enabled.

Figure 3H:
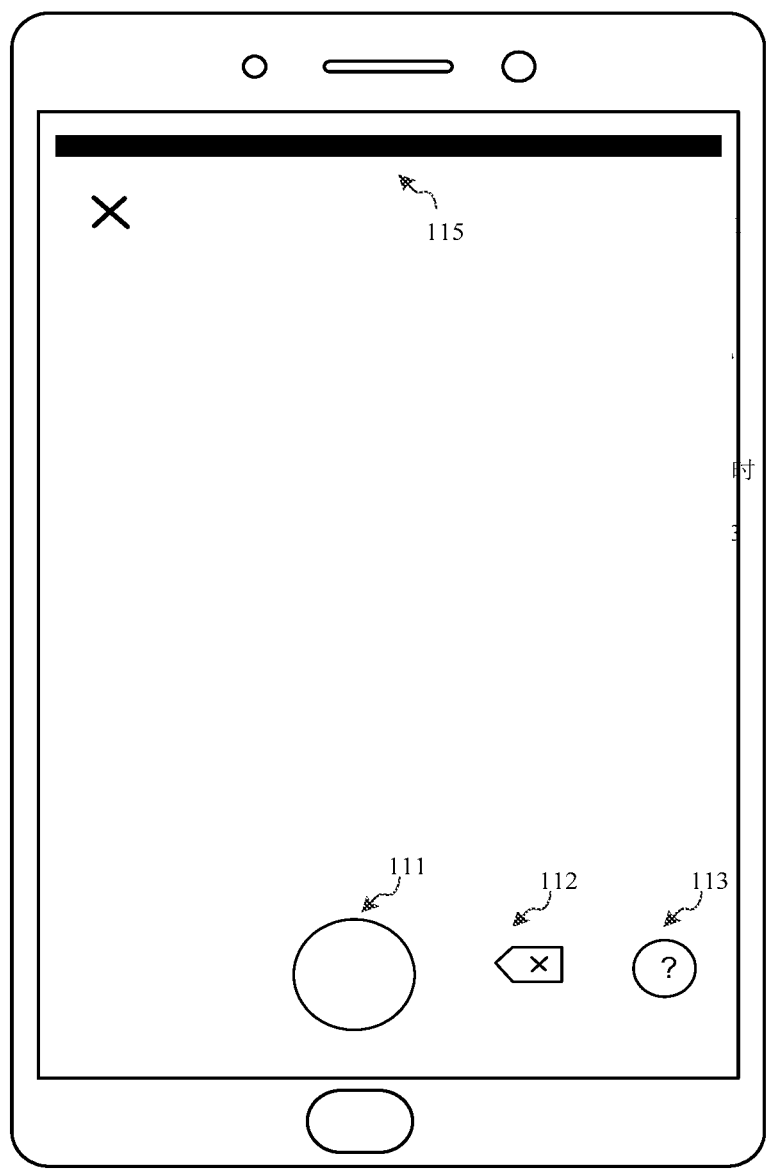
FIG. 3H is a structural schematic diagram of another video shoot interface in an embodiment of the present disclosure.

In another embodiment, as shown in FIG. 3H, a video shooting progress bar 115 is disposed above the video shoot interface; the progress bar 115 in FIG. 3H is completely black, i.e., the progress bar 115 reaches completion (in an embodiment, the total length of an allowed shot is limited, which needs to be less than 15 seconds; therefore, reaching completion of the progress bar means the sum of the length of the previously stored video and the length of the newly recorded video clip is equal to the video length threshold). When the progress bar 115 reaches completion, the previously stored video and the newly recorded video clips are automatically merged to obtain a target video.

With the process of obtaining, in response to detecting a select operation on the draft control in the video post interface, the video and the video post settings, starting, in response to detecting a tap operation on the video record control in the video shoot interface, recording of a video clip starts till detecting a select operation on the video merge control, merging the video and the video clip to obtain the target video, and uploading, in response to detecting the select operation on the post control in the video post interface, the target video and the video post settings to the video server, the technical solution of this embodiment realizes continued recording of a to-be-published video, such that the finally published video may cover different scenes at different time with a large time span and a large geographical span, thereby imparting rich and versatile contents to the target video.

This embodiment is an application of the method for video publishing provided above. In this embodiment, a user records a video of the Great Wall during a business trip to Beijing, inputs video post settings, and then he selects the draft control in the video post interface to store the video and the video post settings in the draft box. Later, when he visits Shanghai, he wants to record the Oriental Pearl Tower in Shanghai; then he gets access to his my profile page, taps the videos folder to get access to the draft box and selects the Great Wall video to jump to the video post interface; he taps the return to edit control to get access to the video edit interface; by selecting the continue recording control in the video edit interface to jump to the video shoot interface, he taps the video record control in the video shoot interface to start recording the Oriental Pearl Tower in Shanghai; when he wants to stop recording, he releases the video record control in the video shoot interface to obtain a corresponding video clip. He selects the end video recording control to merge the Great Wall video previously recorded in Beijing and the Oriental Pearl Tower video recorded in Shanghai. He taps the next control in the video edit interface to jump to the video post interface. Then, he inputs video post settings and taps the draft control in the video post interface to store the video and the video post settings in the draft box. And later, when the user visits Guangzhou, he wants to record the Guangzhou Tower; then he gets access to his my profile page, taps the videos folder to get access to the draft box, and selects the Oriental Pearl Tower video recorded in Shanghai and the Great Wall video recorded in Beijing to get access to the video post interface, where he taps the return to edit control to get access to the video edit interface. In the video edit interface, he selects the continue recording control on the video edit interface to jump to the video shoot interface. In the video shoot interface, he taps the video record control to start recording the Guangzhou Tower; when he wants to stop recording, he releases the video record control in the video shoot interface to obtain a corresponding video clip. Then, he selects the end Video recording control to merge the video merged from the Great Wall video recorded in Beijing and the Oriental Pearl Tower video recorded in Shanghai with the Guangzhou Towner video. In the video edit interface, he taps the next control to jump to the video post interface, where he inputs video post settings and taps the draft control to store the video and the video post settings in the draft box; so on and so forth, till a desired multi-location video is obtained. In this embodiment, the location may also cover different countries. For example, recording a complete video of 10 major landmarks in the world in the same manner.

This embodiment is an application of the method for video publishing provided above. In this embodiment, the user wants to record a video reflecting the growth and change of a kid in one month; then, he may record a segment of video on Jun. 1, 2018 and input video post settings, for example, "babe of June 1"; he taps the draft control in the video post interface to store the video and the video post settings in the draft box. On Jun. 8, 2018, he wants to continue recording the kid; then, he gets access to his my profile page, taps the videos folder to get access to the draft box, where he selects the video of the kid recorded on Jun. 1, 2018 in the draft box; then the interface jumps to the video post interface. In the video post interface, he taps the return to edit control to gets access to the video edit interface. In the video edit interface, he taps the continue recording control to jump to the video shoot interface, where he taps the video record control to start recording the kid of Jun. 8, 2018; when he wants to stop recording, he releases the video record control in the video shoot interface to obtain a corresponding video clip. Once he taps the end video recording control, the Kid video of Jun. 1, 2018 with the Kid video of Jun. 8, 2018 are merged; then, he taps the next control in the video edit interface to jump to the video post interface. in the video post interface, he inputs the video post settings and taps the draft control to store the video and the video post settings in the draft box. On Jun. 15, 2018, the user wants again to continue recording the kind. He gets access to his my profile page, taps the videos folder, enters the draft box, selects the kid video of Jun. 1, 2018 and the kid video of Jun. 8, 2018 to get access the video post interface, where he taps the return to edit control to get access to the video edit interface. In the video edit interface, he taps the continue recording control to jump to the video shoot interface, where he taps the video record control to start recording the kid of Jun. 15, 2018; when he wants to stop recording, he releases the video record control in the video shoot interface to obtain a corresponding video clip. Once he taps the end video recording control, the video merged from the kid video of Jun. 1, 2018 and the kid video of Jun. 8, 2018 is merged with the kid video of Jun. 15, 2018. By tapping the next control in the video edit interface to jump to the video post interface. In the video post interface, he inputs video post settings, taps the draft control, and stores the video and the video post settings in the draft box; so on and so forth, till a satisfactory video covering a plurality of growth stages of the kid is obtained. In this embodiment, the interval between recording dates may be any value, e.g., recording of the video of kid growth within three months may be implemented by the above manner.

Figure 4:
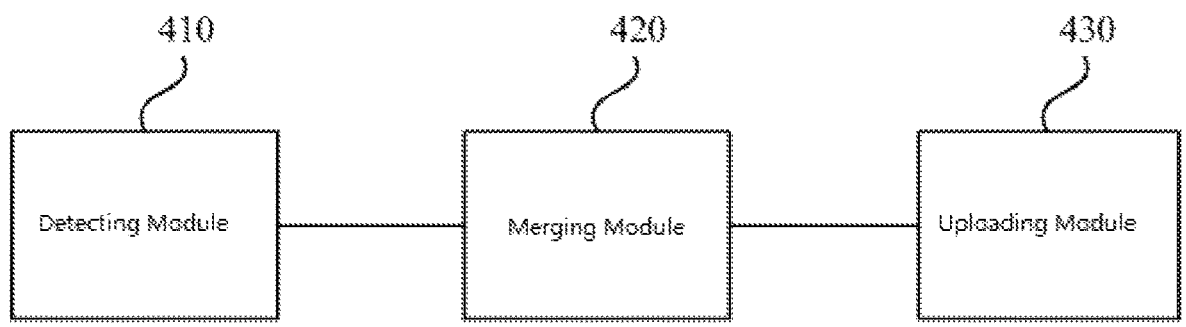
FIG. 4 is a structural schematic diagram of an apparatus for video publishing in an embodiment of the present disclosure.

FIG. 4 is a structural schematic diagram of an apparatus for video publishing in an embodiment of the present disclosure. This embodiment is applicable to the scenario of video publishing. The apparatus may be implemented by software and/or hardware and may be integrated in any device enabling video publishing. As shown in FIG. 4, the video publishing apparatus comprises: a detecting module 410, a merging module 420, and an uploading module 430.

In this embodiment, the detecting module 410 is used for detecting a video recording request after obtaining a video and video post settings, and recording a video clip based on the video recording request till obtaining a video merge instruction;

the merging module 420 is used for merging the video and the video clip based on the video merge instruction to obtain a target video; and the uploading module 430 is used for uploading, in response to detecting a video post instruction, the target video and the video post settings to a video server.

In an embodiment, the apparatus further comprises: a save request obtaining module and a storing module. Particularly, the save request obtaining module is used for obtaining a video save request; and the storing module is used for storing the video and the video post settings based on the video save request.

In an embodiment, the detecting module comprises: a jumping unit, a first recording unit, and a second recording unit, wherein the jumping unit is used for jumping to a record interface based on the video recording request; the first recording unit is used for starting recording in response to obtaining a video record instruction till obtaining an end video recording instruction to thereby obtain a corresponding video clip; the second recording unit is used for repetitively obtaining the video record instruction and the end video recording instruction to obtain corresponding one or more video clips till obtaining the video merge instruction; and the merging module 420 is used for merging the video and all video clips based on the video merge instruction to thereby obtain a target video.

In an embodiment, the apparatus further comprises: an instruction obtaining unit and a delete unit, wherein the instruction obtaining unit is used for: when the video is located in the record interface, obtaining a video clip delete instruction; and the delete unit is used for deleting the latest video clip based on the video clip delete instruction.

The apparatus may execute the method provided in any embodiment of the present disclosure and offers functional modules and beneficial effects corresponding to execution of the method.

With the process of detecting a video recording request after obtaining a video and video post settings, recording a video clip based on the video recording request till obtaining an end video recording instruction, merging the video and the video clip based on the end video recording instruction to obtain a target video, and uploading, in response to detecting a video post instruction, the target video and the video post settings to a video server, the technical solution provided by this embodiment realizes continued recording of a to-be-published video, such that the finally published video may cover different scenes at different time with a large time span and a large geographical span, thereby imparting rich and versatile contents to the target video.

Figure 5:
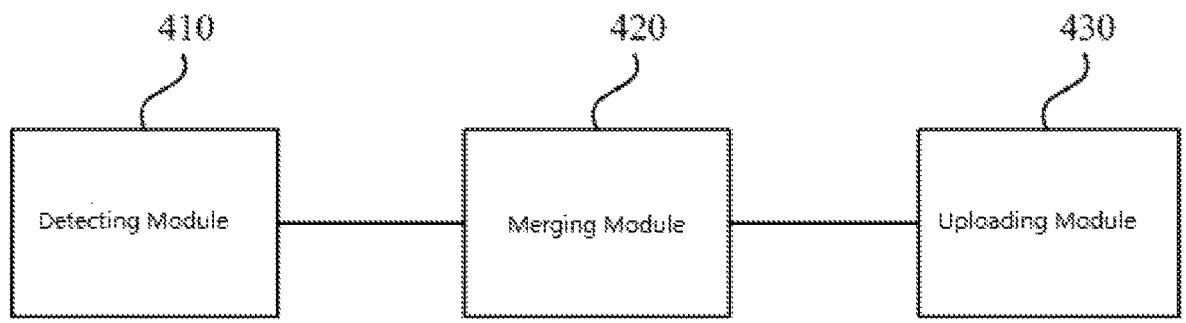
FIG. 5 is a structural schematic diagram of another apparatus for video publishing in an embodiment of the present disclosure.

FIG. 5 is a structural schematic diagram of another apparatus for video publishing in an embodiment of the present disclosure. This embodiment is applicable to the scenario of video publishing. The apparatus may be implemented by software and/or hardware and may be integrated in any device enabling video publishing. As shown in FIG. 5, the video publishing apparatus comprises: an obtaining module 510, a recording module 520, and an uploading module 530.

In this embodiment, the obtaining module 510 is used for obtaining, in response to detecting a select operation on a draft control in a video post interface, a video and video post settings;

the recording module 520 is used for starting, in response to detecting a tap operation on a video record control in a video shoot interface, recording of a video clip till detecting a select operation on a video merge control, and merging the video and the video clip to obtain a target video; and the uploading module 530 is used for uploading, in response to detecting a select operation on a post control in the video post interface, the target video and the video post settings to a video server.

In an embodiment, the recording module is used for: detecting the tap operation on the video record control in the video shoot interface, starting recording a video clip till detecting a release operation on the video record control to obtain a corresponding video clip; continuing to detect the tap operation on the video record control in the video shoot interface to obtain a further video clip till detecting the user's select operation on the video merge control, and merging the video and the video clips to obtain the target video.

In an embodiment, the apparatus further comprises: a delete module used for deleting, in response to detecting a tap operation on a delete control in the video shoot interface, the latest video clip in the video clips.

The apparatus may execute the method provided in any embodiment of the present disclosure and offers functional modules and beneficial effects corresponding to execution of the method.

With the process including obtaining, in response to detecting a select operation on the draft control in the video post interface, the video and the video post settings, starting, in response to detecting a tap operation on the video record control in the video shoot interface, recording of a video clip till detecting a select operation on the video merge control, merging the video and the video clip to obtain the target video; and uploading, in response to detecting the select operation on the post control in the video post interface, the target video and the video post settings to the video server, the technical solution of this embodiment realizes continued recording of a to-be-published video, such that the finally published video may cover different scenes at different time with a large time span and a large geographical span, thereby imparting rich and versatile contents to the target video.

Figure 6:
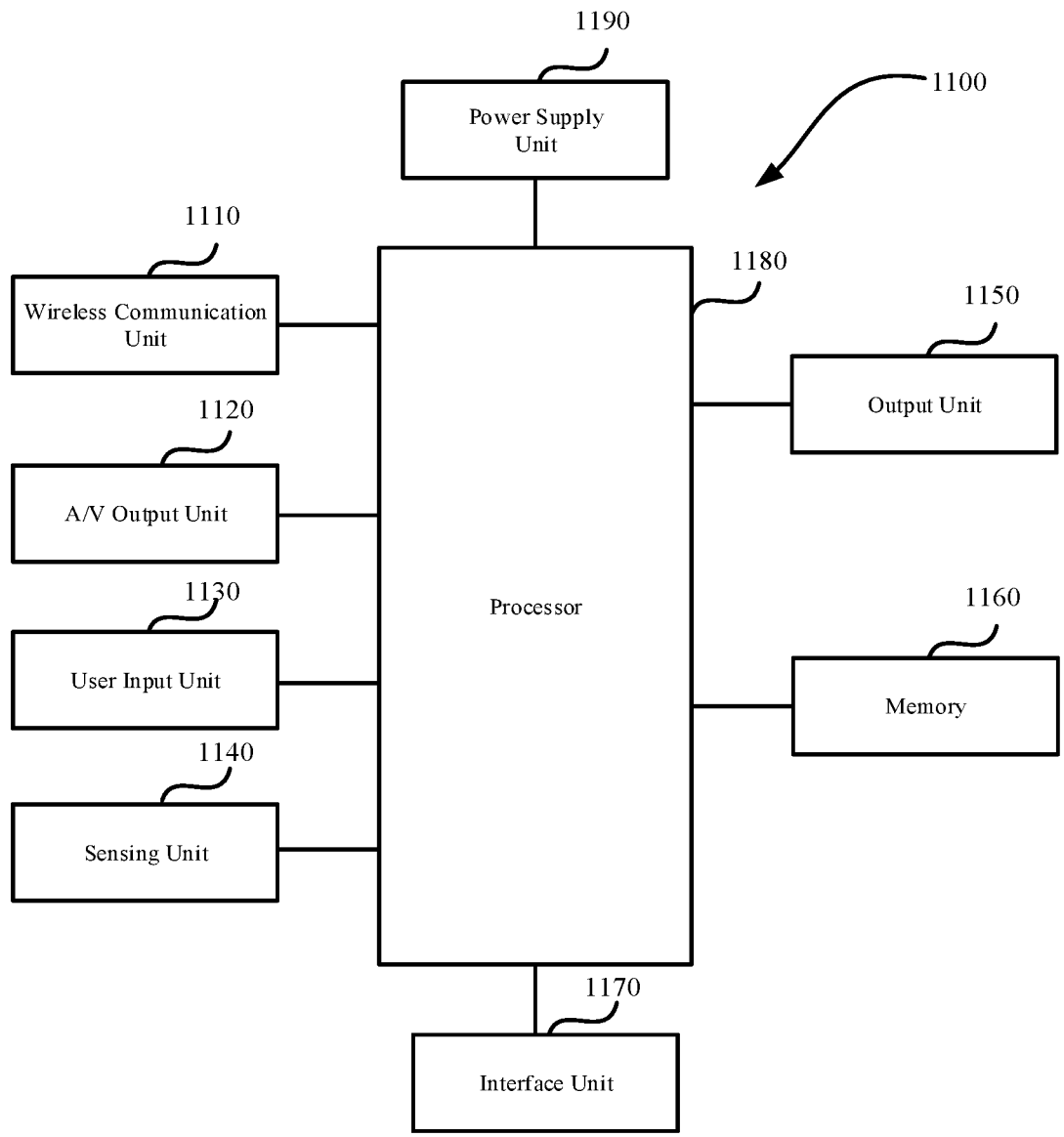
FIG. 6 is a structural schematic diagram of a terminal device in an embodiment of the present disclosure.

FIG. 6 is a structural schematic diagram of a terminal device according to an embodiment of the present disclosure. Based on the hardware structural schematic diagram of the terminal device in this embodiment of the present disclosure, the terminal device may be implemented in various forms. The terminal in the present disclosure may include, but are not limited to, a mobile terminal such as a mobile phone, a smart phone, a laptop computer, a digital broadcast receiver, a personal digital assistant PDA, a portable Android device (PAD), a portable media player (PMP), a navigation device, a vehicle-mount terminal device, a vehicle-mount display terminal device, and a vehicle-mount electronic rear mirror, etc., and a fixed terminal such as a digital television (TV), and a desk computer, etc.

As shown in FIG. 6, the terminal device 1100 may comprise a wireless communication unit 1110, an A/V (audio/video) input unit 1120, a user input unit 1130, a sensing unit 1140, an output unit 1150, a memory 1160, an interface unit 1170, a processor 1180, and a power supply unit 1190, etc. Although FIG. 6 shows a terminal device having various components, it should be understood that it is not required to implement all of the components as shown. Alternatively, more or less components may be implemented.

In an embodiment, the wireless communication unit 1110 allows for radio communication between the terminal device 1100 and the wireless communication system or network. The A/V input unit 1120 is used for receiving an audio or video signal. The user input unit 1130 may be used for inputting data via a command generation key inputted by the user so as to control at least one operation of the terminal. The sensing unit 1140 is used for detecting the current state of the terminal device 1100, the location of the terminal device 1100, whether there is a tap input to the terminal device 1100 by the user, the orientation of the terminal device 1100, the acceleration or deceleration movement and orientation of the terminal device 1100, and etc., and generates commands or signals for controlling operations of the terminal device 1100. The interface unit 1170 serves as an interface for connecting between at least one external device and the terminal device 1100. The output unit 1150 is used to provide an output signal by visual, audio, and tactile means. The memory 1160 may be used for storing a software program for processing and controlling operations executed by the processor 1180, or may temporarily store the already outputted or to-be-outputted data. The memory 1160 may include at least one type of memory medium. Moreover, the terminal device 1100 may collaborate with a network storage device that is connected to the network to execute the storage function of the memory 1160. The processor 1180 generally controls the overall operations of the terminal device. Additionally, the processor 1180 may comprise a multimedia module used for reproducing or playing back the multimedia data. The processor 1180 may execute pattern recognition processing so as to identify the handwritten input or picture drawing input executed on a tap screen. The power supply unit 1190 is used for receiving, under the control of the processor 1180, external power or internal power, and providing power appropriate for manipulating at least one element or component.

The processor 1180 is used for executing at least one functional application or data processing by running a program stored in the memory 1160, for example, implementing the method for video publishing provided in any embodiment of the present disclosure. For example, when executing the program, the processor 1180 implements: detecting a video recording request after obtaining a video and video post settings, and recording a video clip based on the video recording request till obtaining a video merge instruction; merging the video and the video clip based on the video merge instruction to obtain a target video; and uploading, in response to detecting a video post instruction, the target video and the video post settings to a video server.

The processor may also implement another kind of method for video publishing provided in the embodiments of the present disclosure. For example, when executing the program, the processor 1180 implements: obtaining, in response to detecting a select operation on a draft control in a video post interface, a video and video post settings; starting, in response to detecting a tap operation on a video record control in a video shoot interface, recording of a video clip till detecting a select operation on a video merge control, and merging the video and the video clip to obtain a target video; and uploading, in response to detecting a select operation on a post control in the video post interface, the target video and the video post settings to a video server.

An embodiment of the present disclosure provides a computer-readable memory medium on which a computer program is stored; the program, when being executed, implements the methods for video publishing provided by all embodiments of the present disclosure. For example, the program, when being executed, implements: detecting a video recording request after obtaining a video and video post settings, and recording a video clip based on the video recording request till obtaining a video merge instruction; merging the video and the video clip based on the video merge instruction to obtain a target video; and uploading, in response to detecting a video post instruction, the target video and the video post settings to a video server.

The processor may also implement another kind of method for video publishing provided in the embodiments of the present disclosure. For example, when executing the program, the processor 1180 implements: obtaining, in response to detecting a select operation on a draft control in a video post interface, a video and video post settings; starting, in response to detecting a tap operation on a video record control in a video shoot interface, recording of a video clip till detecting a select operation on a video merge control, and merging the video and the video clip to obtain a target video; and uploading, in response to detecting a select operation on a Post control in the video post interface, the target video and the video post settings to a video server.

Any combination of one or more computer-readable mediums may be adopted. The computer readable medium may be a computer readable signal medium or a computer readable memory medium. The computer-readable memory medium, for example, may be, but not limited to, an electrical, magnetic, optical, electromagnetic, infrared, or semiconductor system, apparatus or device, or any combination thereof. More specific examples (a non-exhaustive list) of the computer-readable memory medium may include an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above. In the present disclosure, the computer-readable storage medium may be any tangible medium containing or storing a program that may be used by an instruction executing system, an apparatus, or a device or used in combination with the instruction executing system, the apparatus, or the device.

The computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable memory medium, which computer-readable medium may send, propagate or transmit the programs used by an instruction executing system, an apparatus or a device or used in combination with the instruction executing system, the apparatus or the device.

The program codes contained on the computer-readable medium may be transmitted using any appropriate medium, including, but not limited to: wireless, wired, cable, RF (Radio Frequency), etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

I claim:

1. A method of video publishing, comprising:
   detecting a video recording request after obtaining a video and video post settings, and recording a video clip based on the video recording request till obtaining a video merge instruction, wherein the video and the video post settings are video and video post settings in the current video post interface;
   merging the video and the video clip based on the video merge instruction to obtain a target video;
   uploading, in response to detecting a video post instruction, the target video and the video post settings to a video server; and
   wherein the recording a video clip based on the video recording request till obtaining a video merge instruction further comprises:
   jumping to a record interface based on the video recording request,
   starting a recording by a user tapping a video record control and ending the recording by the user releasing the video record control to obtain a first video clip,
   starting a second recording by a user tapping the video record control and ending the second recording by the user releasing the video record control to obtain a second video clip, and
   perform page jumping when the user taps a video merge control.

2. The method according to claim 1, wherein before the detecting a video recording request and recording a video clip based on the video recording request till obtaining a video merge instruction, the method further comprises:
   obtaining a video save request; and
   storing the video and the video post settings based on the video save request.

3. The method according to claim 1, further comprising:
   determining whether a sum of a length of the video and a length of the video clip reaches a video length threshold.

4. The method according to claim 1, further comprising:
   in the record interface, obtaining a video clip delete instruction; and
   deleting a latest video clip based on the video clip delete instruction.

5. An apparatus of video publishing, comprising:
   at least one processor; and
   at least one memory communicatively coupled to the at least one processor and storing instructions that upon execution by the at least one processor cause the apparatus to perform operations comprising:
   detecting a video recording request after obtaining a video and video post settings, and recording a video clip based on the video recording request till obtaining a video merge instruction, wherein the video and the video post settings are video and video post settings in the current video post interface;
   merging the video and the video clip based on the video merge instruction to obtain a target video;
   uploading, in response to detecting a video post instruction, the target video and the video post settings to a video server; and
   wherein the recording a video clip based on the video recording request till obtaining a video merge instruction further comprises:
   jumping to a record interface based on the video recording request,
   starting a recording by a user tapping a video record control and ending the recording by the user releasing the video record control to obtain a first video clip,
   starting a second recording by a user tapping the video record control and ending the second recording by the user releasing the video record control to obtain a second video clip, and
   perform page jumping when the user taps a video merge control.

6. The apparatus according to claim 5, wherein the apparatus further performs operations comprising:
   before the detecting a video recording request and recording a video clip based on the video recording request till obtaining a video merge instruction,
   obtaining a video save request; and
   storing the video and the video post settings based on the video save request.

7. The apparatus according to claim 5,
   wherein the merging the video and the video clip based on the video merge instruction to obtain a target video further comprises merging the video, the first video clip and the second video clip based on the video merge instruction to obtain the target video.

8. The apparatus according to claim 5, further comprising:
   determining whether a sum of a length of the video and a length of the video clip reaches a video length threshold.

9. The apparatus according to claim 5, wherein the apparatus further performs operations comprising:
   in the record interface, obtaining a video clip delete instruction; and
   deleting a latest video clip based on the video clip delete instruction.

10. A non-transitory computer-readable memory medium on which a computer program is stored, wherein the computer program, when being executed by a processor, implements operations, the operations comprising:
    detecting a video recording request after obtaining a video and video post settings, and recording a video clip based on the video recording request till obtaining a video merge instruction, wherein the video and the video post settings are video and video post settings in the current video post interface;

merging the video and the video clip based on the video merge instruction to obtain a target video;

uploading, in response to detecting a video post instruction, the target video and the video post settings to a video server; and wherein the recording a video clip based on the video recording request till obtaining a video merge instruction further comprises:

jumping to a record interface based on the video recording request, starting a recording by a user tapping a video record control and ending the recording by the user releasing the video record control to obtain a first video clip, starting a second recording by a user tapping the video record control and ending the second recording by the user releasing the video record control to obtain a second video clip, and perform page jumping when the user taps a video merge control.

11. The non-transitory computer-readable memory medium of claim 10, wherein before the detecting a video recording request and recording a video clip based on the video recording request till obtaining a video merge instruction, the operations further comprise:

obtaining a video save request; and storing the video and the video post settings based on the video save request.

12. The non-transitory computer-readable memory medium of claim 10, wherein the merging the video and the video clip based on the video merge instruction to obtain a target video further comprises merging the video, the first video clip and the second video clip based on the video merge instruction to obtain the target video.

13. The non-transitory computer-readable memory medium of claim 10, the operations further comprising:

determining whether a sum of a length of the video and a length of the video clip reaches a video length threshold.

14. The non-transitory computer-readable memory medium of claim 10, the operations further comprising:

in the record interface, obtaining a video clip delete instruction; and deleting a latest video clip based on the video clip delete instruction.

* * * * *